No. 608,399. Patented Aug. 2, 1898.
A. B. BOSCA & E. W. BENNER.
APPARATUS FOR UNWINDING CYLINDRICAL COTTON BALES.
(Application filed Nov. 29, 1897.)
(No Model.) 2 Sheets—Sheet 1.
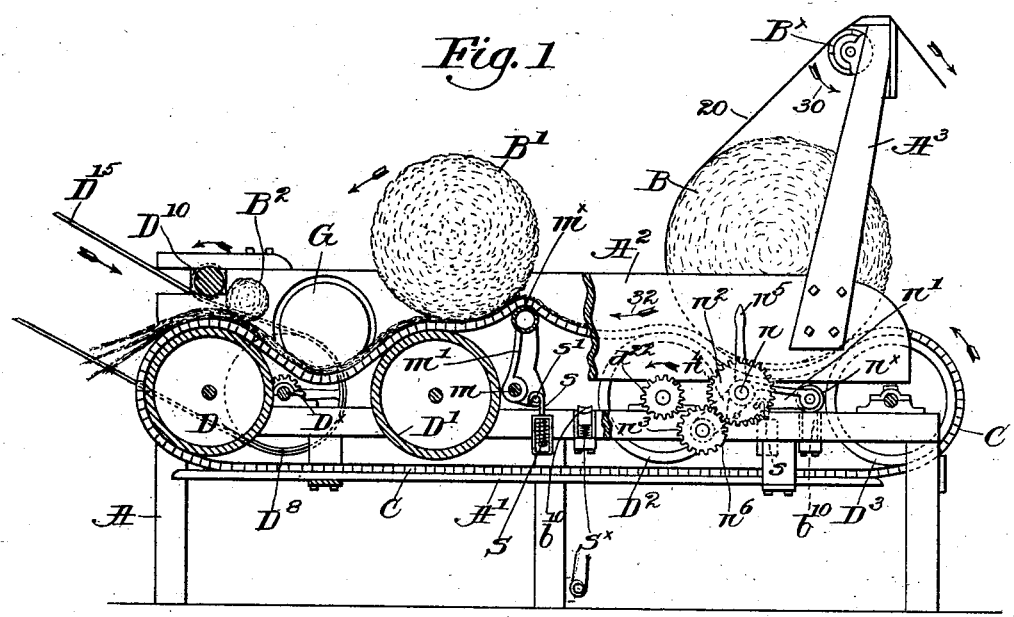
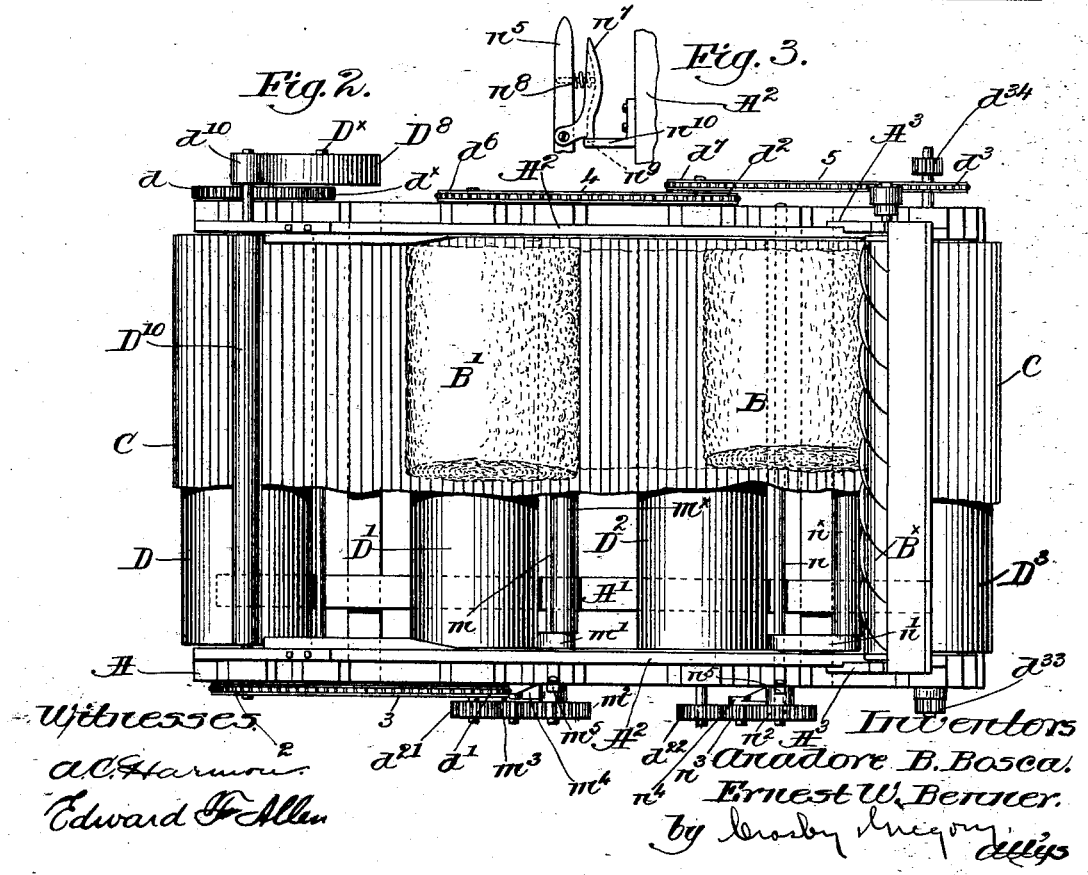

No. 608,399. Patented Aug. 2, 1898.
A. B. BOSCA & E. W. BENNER.
APPARATUS FOR UNWINDING CYLINDRICAL COTTON BALES.
(Application filed Nov. 29, 1897.)
(No Model.) 2 Sheets—Sheet 2.
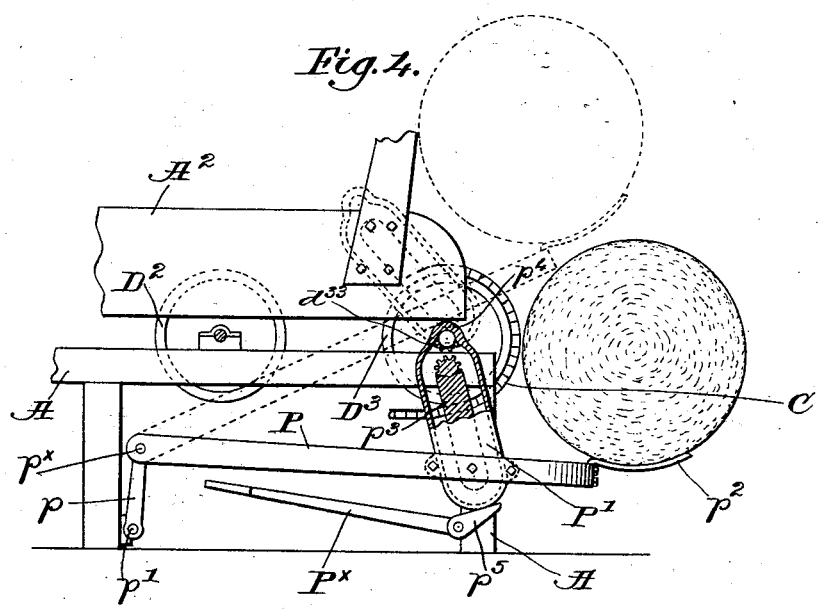
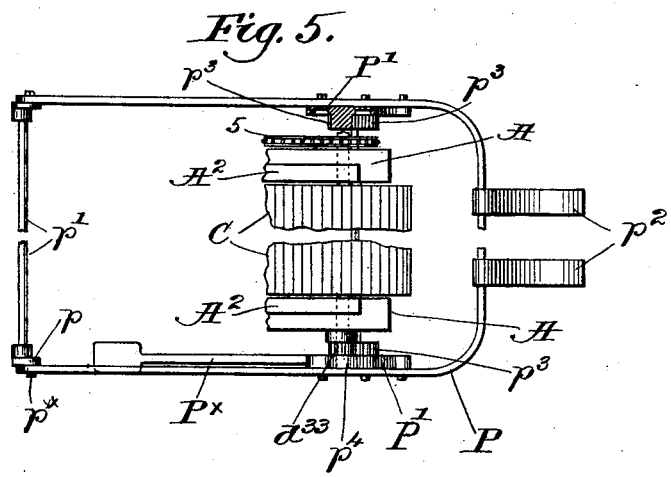
Witnesses:
A. C. Harmon
Edward F. Allen
Inventors:
Amadore B. Bosca
Ernest W. Benner
by Crosby Gregory attys
THE NORRIS PETERS CO., PHOTO-LITHO., WASHINGTON, D. C.

UNITED STATES PATENT OFFICE.

ANADORE B. BOSCA AND ERNEST W. BENNER, OF LOWELL, MASSACHUSETTS.

APPARATUS FOR UNWINDING CYLINDRICAL COTTON-BALES.

SPECIFICATION forming part of Letters Patent No. 608,399, dated August 2, 1898.

Application filed November 29, 1897. Serial No. 660,114. (No model.)

*To all whom it may concern:*

Be it known that we, ANADORE B. BOSCA and ERNEST W. BENNER, of Lowell, county of Middlesex, and State of Massachusetts, have invented an Improvement in Apparatus for Unwinding Cylindrical Cotton-Bales, of which the following description, in connection with the accompanying drawings, is a specification, like letters and figures on the drawings representing like parts.

A considerable and constantly-increasing amount of cotton is now delivered to manufacturers in the form of cylindrical bales, wherein the cotton in a continuous bat of substantially uniform thickness and density is wound, lap upon lap, into a hard compressed cylinder without any central arbor or core of any kind.

Our present invention has for its object the production of simple and effective apparatus for unwinding cotton-bales of the foregoing type prior to the introduction of the cotton to the usual picking machinery of a cotton-factory, whereby a continuous and substantially uniform bat is rapidly delivered with a minimum of handling and labor. In accordance therewith we have illustrated in the accompanying drawings one embodiment of our invention, the same consisting, essentially, of an endless traveling carrier the upper run of which is arranged to travel in a sinuous path, forming one or more depressions, each depression being adapted to receive and support a bale to be unwound, the unwound bat being carried by the carrier to a suitable delivery-point.

The depressed portion of the carrier by increasing the arc of contact with the bale aids in the rotation of the bale and the unwinding of the bat and retains the bale until nearly unwound; but when the weight of the bale is so decreased as to be overcome by the pull of the bat and the motion of the carrier the unwound portion will be drawn up and along the carrier out of the depression. In order to prevent such unwound mass from being delivered from the apparatus, we provide a rotating detent at the delivery end thereof above the bat, the direction of rotation being opposite to that of the unwinding bale, so that as the latter meets the detent it will be retained and rotated thereby until substantially complete unwinding is effected.

We have herein shown our apparatus as adapted to perform the unwinding operation continuously, so that bales may be placed therein one after another and begin to unwind before the complete unwinding of the first bale, whereby a continuous bat or a bat of two or more plies may be unwound and delivered.

It will thus be obvious that by our invention we are enabled to unwind bales most effectively with a minimum amount of handling, and also to greatly economize in the matter of time, for a number of bats from as many bales can be delivered simultaneously.

Figure 1 is a side elevation and partial longitudinal section of an apparatus embodying our invention, the bale-loading mechanism being omitted to avoid confusion and save space. Fig. 2 is a plan view thereof, showing the operating-pinions for the loading mechanism. Fig. 3 is an enlarged detail to be described of a locking device. Fig. 4 is a side elevation of the receiving end of the apparatus shown in Fig. 1 with a loading mechanism applied thereto; and Fig. 5 is a plan view of the loading mechanism, centrally broken out.

Referring to the drawings, the frame A of suitable size and shape to support the operative parts of the apparatus is herein shown as provided with bearings for the journals of a plurality of rotatable drums D, D', D², and D³, acting as supports for an endless traveling carrier 6, shown as a slatted apron or lattice of well-known construction and in general use in cotton machinery.

The carrier is of greater length than necessary to merely pass around the endmost drums, so that the upper run of the carrier may sag or be depressed between its rotatable supports, the upper run thus assuming a sinuous path as it travels forward.

Rotation may be imparted to the drums in any suitable manner, and herein we have shown a pinion $d^\times$ on a driving-shaft $D^\times$ in mesh with a gear $d$, fast on the journal of the drum D, the said journal at its other end, Fig. 2, having a sprocket-wheel 2, connected by a suitable chain 3 with a sprocket-wheel $d'$ on the journal of drum D'. On the other end of the journal a sprocket-wheel $d^6$ is connected by a chain 4 with a sprocket-wheel $d^2$ on the journal of drum $D^2$, a second wheel $d^7$ on said journal being connected by a chain 5 with a sprocket-wheel $d^3$ on the journal of drum $D^3$.

The lower run of the carrier C may, if desired, be supported by a longitudinal shelf A', Fig. 1, suitably attached to the frame, the latter being also provided with upright sides $A^2$, extending the length of the frame just beyond the ends of the drums and the longitudinal edges of the carrier to prevent lateral movement of the bales and bats during the unwound operation.

The bales to be unwound are placed in the depressions or sagging portions of the upper run of the carrier between two of the supporting-drums instead of over the latter, the weight of the bale taking up some of the slack of the carrier and increasing and maintaining the hollow or depression. So long as the depression is maintained by the weight of the bale or otherwise the forward movement of the carrier will cause the bale to rotate and to unwind the bat, the latter being carried along by the carrier, while the inclined sides of the depression retain the bale therein. This prevents any liability of one bale being carried forward by the travel of the carrier to interfere with another bale and so render the apparatus inoperative, as we prefer to unwind several bales at once.

In the operation of the apparatus a bale, as B, Figs. 1 and 2, is placed upon the carrier at the right-hand end of the machine between the drums $D^2$ and $D^3$, and the first thing to be accomplished is the removal of the cover 20, of burlap or other cloth. If this is wound helically upon the bale, the end of the cover is detached and carried up over a suitable brush or delinting-roll $B^\times$, mounted in supports $A^3$ on the frame and rotated by any suitable means in the direction of arrow 30, Fig. 1, so that the valuable staple which clings to the under surface of the cover may be stripped off and saved without hand labor. When the cover is removed and the end of the bat found and loosened, the travel of the carrier C in the direction of arrow 32, Fig. 1, will carry the bat along as the rotation given to the bale unwinds it, the bat finally passing from the delivery end of the apparatus.

In the apparatus herein shown three bales B, B', and $B^2$ are being unwound simultaneously, thus delivering a three-ply bat, the second bale B' resting on the bat coming from bale B, while the bats from both of these bales pass under the third bale $B^2$.

We prefer to run the apparatus continuously by moving the middle and rearmost bales ahead into the places formerly occupied by the leading and middle bales, respectively, as the leading bale is completely unwound and inserting a fresh bale in the place formerly occupied by the rearmost bale as each transfer is effected. The leading bale, as $B^2$, is almost entirely unwound while in the depression of the carrier between the drums D and D'; but as its weight decreases to such a point that it will not maintain the carrier properly depressed we prefer to mount above the carrier at each side of the frame suitable rotatable pulleys or disk-like guides G, which bear upon the carrier near its edges and maintain the downward curve in its path between the drums D and D'. Owing to the decreasing weight of the bale the depression in the carrier will finally cease to be effective and the unwound mass remaining will be carried forward and discharged in such condition unless prevented. We effect this by means of a detent (shown as a small roller $D^{10}$) mounted above the drum D at a sufficient height above the carrier to permit the desired thickness of bat to pass between them, the roller being rotated at a high speed oppositely to the direction of rotation of the bale in unwinding. The roller acts upon the unwound mass and tends to drive it back, imparting at the same time rotation thereto to unwind it until it is sufficiently unwound to be discharged.

A friction-pulley $d^{10}$ on the journal of the detent $D^{10}$ is shown in position to be engaged by the outer surface of the driving-belt $D^{15}$, passed around the pulley $D^8$ on the driving-shaft $D^\times$, such engagement of the belt rotating the detent at high speed in the proper direction.

When the leading bale has been unwound, the next bale behind is moved forward into the front depression in the upper run of the carrier, and the third bale, in the apparatus herein shown, is moved forward into the place left vacant by the middle bale, so that a fresh bale can be placed in the apparatus. Such transfer of the bales could be accomplished by the attendants lifting the bales over the supporting-drums of the carrier; but we have herein shown one convenient form of means for effecting the transfer easily and mechanically.

Rock-shafts $m$ and $n$ are journaled in the main frame below the upper run of the carrier, near and behind the drums D' and $D^2$, respectively, said shafts having arms $m'$ $n'$ fast thereon, which carry at their ends preferably rotatable rolls $m^\times$ $n^\times$. The rock-shaft $n$ extends at one end beyond the side $A^2$ and has fast thereon a gear $n^2$ in mesh with a stop-gear $n^3$, rotatably mounted on an arm $n^4$, pivotally hung on the rock-shaft and adapted to be moved into mesh with the pinion $d^{22}$ on the shaft of drum $D^2$. Normally the roll $n^\times$ is in the position shown back of the lowest point of the depressed portion of the carrier C in which the bale B rests, but when the gear $n^3$ is lifted, by means of a suitable hand-lever $n^5$, into mesh with the pinion $d^{22}$ the latter will rotate said gear, and thereby the gear $n^2$. The rock-shaft $n$ is thus partially rotated to raise and move the roll $n^\times$ upward and forward in the arc of a circle against the under side of the carrier, lifting the latter behind the bale B until the latter rolls or is carried forward over the drum $D^2$ and into the depression of the carrier between drums $D^2$ and $D'$. At this point the continuous portion $n^6$ of gear $n^3$ comes in contact with and is thrown out of mesh with the pinion $d^{22}$, and the forward movement of the roll $n^\times$ ceases, its return to normal position being facilitated by a spring S, acting on a plunger $s$, attached to a pin $s'$ on one of the arms $n'$, (see Fig. 1,) like parts for the rock-shaft $m$ and roll $m^\times$ having like letters of reference. To avoid shock on the return of the roll to normal position, a buffer $b^{10}$, resting on a spring $S^\times$, is supported by the frame A in position to receive the roll, as shown only in Fig. 1.

The gears $m^2$ $m^3$, arm $m^4$, and lever $m^5$ for operating the roll $m^\times$ correspond in construction to the parts $n^2$, $n^3$, $n^4$, and $n^5$, respectively, hereinbefore particularly described, while a pinion $d^{21}$ on the shaft of drum $D'$ operates the gear $m^3$.

Any suitable lock may be provided to hold the controlling-levers $m^5$ and $n^5$ from accidental movement, one form being shown in Fig. 3. A latch $n^7$, pivoted on the handle and controlled by a spring $n^8$, has a depending lug $n^9$, which bears against a projection $n^{10}$, fast on the frame side $A^2$, except when withdrawn by the grasp of the operator's hand pressing the latch toward the lever.

In the drawings the roll $m^\times$ is shown in its highest point, with the bale $B'$ moving along the carrier to the front depression to take the place of the bale $B^2$, the unwinding of the latter bale being shown as almost completed by the detent.

Obviously we are not limited to the length and capacity of the apparatus as herein shown, as any desired number of bales may be treated in a similar manner, a greater number of bales consistent with economical handling and other considerations giving a better mixture, which is always desirable. So, too, one or two bales may be unwound, if desirable for any reason, instead of a greater number, but in any case the manual labor in connection with the apparatus is reduced to one attendant.

We are aware that a lap of cotton or other fibrous material has been unwound by means of a carrier depressed between supporting drums or rolls operating in connection with a heavy iron core or arbor driven into the center of or on which the bale is wound to insure unwinding, and we do not claim such construction. Our apparatus is expressly designed to avoid the use of such a core or arbor or equivalent or of the iron rods or centers which it has heretofore been customary to drive into such bales or laps preliminary to unwinding them on an ordinary horizontal traveling apron.

The bales are quite heavy, and the mechanism shown in Figs. 4 and 5 is adapted to readily lift the bales into position upon the carrier. A substantially U-shaped frame or yoke P is pivotally connected at $p^\times$ to rocker-arms $p$, mounted on a rock-shaft $p'$, journaled in the main frame A, said yoke extending outside of and at the rear of the frame and having at its bend suitable rests $p^2$, slightly concave, as in Fig. 4, to receive a bale from a truck. On the inner side of the yoke castings $P'$ are rigidly attached to each arm thereof, each casting having a longitudinal central bar $p^3$, continuously toothed at its sides and rounded ends, said rack-bars being adapted to be at times engaged simultaneously by pinions $d^{33}$ $d^{34}$ on the ends of the shaft of the drum $D^3$. (See Figs. 2 and 4.) The racks are extended inward beyond the castings in the planes of the pinions, while the ends of the shaft to which the latter are secured extend into the castings and normally act to support the latter and the outer end of the yoke P, the hooked upper ends $p^4$ of said castings hanging, as it were, on the shaft ends. A treadle $P^\times$ is shown in Figs. 4 and 5 as mounted on the frame A, with its cam end $p^5$ below the casting $P'$ on that side of the yoke.

In the normal or full-line position of the bale-lifting mechanism, Fig. 4, the racks and pinions are out of engagement; but when a bale is to be lifted onto the carrier C an attendant depresses the treadle to thereby slightly lift the yoke. This brings the slowly-rotating pinions $d^{33}$ $d^{34}$ into mesh with the racks $p^3$, and by the continued rotation of the pinions the racks and castings are lifted gradually into dotted-line position, Fig. 4, elevating the yoke and the bale carried thereby until the bale can by a slight push be dislodged from the rests $p^2$ and transferred to the carrier. During this movement of the yoke and "rack-carriers," as the castings $P'$ may be termed, the shaft ends travel within the side walls of the said castings, the rocker-arms $p'$ permitting the slight bodily movement of the yoke to the right, Figs. 4 and 5. After reaching the lower ends of the racks the pinions travel around to the opposite sides of the racks, and the yoke is lowered thereby into normal position to receive a fresh bale upon the rests $p^2$. By making the fulcra $p^\times$ of the yoke movable the slight bodily movement of the yoke in the direction of its length is permitted, as will be readily understood.

The lifting mechanism enables heavy bales to be easily and rapidly handled with a minimum amount of labor.

Having fully described our invention, what we claim, and desire to secure by Letters Patent, is—

1. In an apparatus of the class described, an endless traveling carrier, rotatable supports for and between which the upper run of the carrier is depressed, to receive and support the bale to be unwound, means to rotate the supports, a detent located near the delivery end of the carrier, and means to positively rotate the detent oppositely to the rotation of the bale, on the carrier, to thereby effect the final unwinding of said bale upon the carrier.

2. In an apparatus of the class described, an endless carrier, supports for and between which the upper run of the carrier is depressed, to receive and support the bale, means to effect rotation of said supports and longitudinal movement of the carrier, a rotating detent located above and adjacent the delivery end of the latter, and means to positively rotate the detent in a direction opposite to the rotation of the bale on the carrier, to act upon and effect the final unwinding of the bat upon the carrier.

3. In an apparatus of the class described, an endless traveling carrier, end and intermediate supports for and between which the upper run of the carrier is depressed, to receive and support in each depression a bale to be unwound, means to rotate said supports, means to prevent lateral movement of the bales and bats as unwound therefrom, and a detent located above and adjacent the delivery end of the carrier, and means to rotate it oppositely to the rotation of the bales, to act upon and effect the final unwinding of a bale when brought in contact therewith by the travel of the carrier.

4. In an apparatus of the class described, an endless traveling carrier having a sinuous upper run to present a plurality of depressions each adapted to receive and support bales to be unwound, means to temporarily lift one of said depressed portions of the carrier to transfer the bale supported thereby to the next adjacent depression ahead, and a rotating detent to effect final unwinding of the leading bale.

5. In an apparatus of the class described, an endless traveling carrier, supports for and between which the upper run of the carrier is depressed to receive and support the bale to be unwound, independent means to maintain the carrier depressed as the weight of the bale decreases, and a detent rotated above the unwound bat as delivered, to act upon and complete the unwinding of the bale upon the carrier.

6. In an apparatus of the class described, an endless traveling carrier having a sinuous upper run to present a plurality of depressions each adapted to receive and support bales to be unwound, independent means to maintain the final depression as the weight of the bale supported thereby decreases, an adjacent rotating detent located above the carrier, to act upon and complete the unwinding of the bale upon the carrier, and means to temporarily lift the next adjacent rear depression of the upper run to transfer the bale supported thereby to the final depression.

7. In an apparatus of the class described, an endless traveling carrier having a sinuous upper run to present a plurality of depressions each adapted to receive and support bales to be unwound, means to temporarily lift one of said depressed portions of the carrier to transfer the bale supported thereby to the next adjacent depression ahead, a rotating detent located at the delivery end of the carrier to effect final unwinding of the leading bale, and a revolving delinter at the receiving end of the apparatus, to act upon the inner face of the bale-cover and remove the staple threfrom.

8. In an apparatus of the class described, an endless traveling carrier, a continuously-rotating shaft having attached pinions, a bale-support normally in position to receive a bale to be unwound, racks attached to said support and normally disengaged from said pinions, and means to bring said racks and pinions into engagement, whereby the bale-support is lifted by the rotative movement of the pinions to bring the bale on the support into position to be transferred to the carrier.

9. A bale-lifting device, comprising a yoke having movable fulcra and adapted to support a bale at its free end, continuously-toothed racks rigidly secured to said yoke, rotating pinions mounted in fixed bearings, and means to bring said racks and pinions into engagement, whereby the yoke is lifted, and thereafter returned to normal position, disengaging the racks and pinions.

10. A bale-lifting device comprising a pivotally-mounted yoke adapted to support a bale at its free end, castings thereon having rack-bars, and hoods at their upper ends, a rotating shaft having pinions fast thereon, and adapted at times to engage the racks, to raise and lower the yoke, the ends of the shafts normally extending into the hoods, to sustain the yoke, and means to control the engagement of the racks and pinions.

In testimony whereof we have signed our names to this specification in the presence of two subscribing witnesses.

ANADORE B. BOSCA.
    ERNEST W. BENNER.

Witnesses:
 CHAS. W. EATON,
 OSCAR R. JOHNSON.